United States Patent
Unzueta

(10) Patent No.: US 9,262,671 B2
(45) Date of Patent: Feb. 16, 2016

(54) SYSTEMS, METHODS, AND SOFTWARE FOR DETECTING AN OBJECT IN AN IMAGE

(71) Applicant: Nito, Inc., New York, NY (US)

(72) Inventor: Luis Unzueta, Donostia-San Sabastian (ES)

(73) Assignee: Nito Inc., New York, NY (US)

(*) Notice: Subject to any disclaimer, the term of this patent is extended or adjusted under 35 U.S.C. 154(b) by 110 days.

(21) Appl. No.: 14/213,347

(22) Filed: Mar. 14, 2014

(65) Prior Publication Data

US 2014/0270374 A1 Sep. 18, 2014

Related U.S. Application Data

(60) Provisional application No. 61/801,788, filed on Mar. 15, 2013.

(51) Int. Cl.
*G06K 9/00* (2006.01)
*H04N 5/225* (2006.01)

(52) U.S. Cl.
CPC ........ *G06K 9/00281* (2013.01); *G06K 9/00248* (2013.01); *G06K 9/00201* (2013.01)

(58) Field of Classification Search
CPC .................................. G06K 9/00; H04N 1/00
USPC ................. 382/103, 115–116, 117, 118, 236; 348/169, 170, 171, 172, 352
See application file for complete search history.

(56) References Cited

U.S. PATENT DOCUMENTS

| | | | |
|---|---|---|---|
| 5,063,603 A | 11/1991 | Burt | |
| 5,164,831 A | 11/1992 | Kuchta et al. | |
| 7,027,619 B2* | 4/2006 | Pavlidis ............... | G06K 9/2018 382/115 |
| 8,073,287 B1* | 12/2011 | Wechsler ........... | G06K 9/00281 359/306 |
| 8,259,102 B2* | 9/2012 | Lim ........................ | G06T 13/40 345/419 |
| 8,509,496 B2* | 8/2013 | Steinberg ........... | G06K 9/00228 382/103 |
| 2007/0286490 A1 | 12/2007 | Danowitz | |
| 2008/0317357 A1 | 12/2008 | Steinberg et al. | |
| 2009/0110248 A1 | 4/2009 | Masuda et al. | |
| 2011/0090375 A1 | 4/2011 | Takeuchi et al. | |
| 2011/0304629 A1 | 12/2011 | Winchester | |
| 2012/0213490 A1 | 8/2012 | Steiner | |
| 2012/0288166 A1 | 11/2012 | Sun et al. | |
| 2012/0321140 A1 | 12/2012 | Xiong et al. | |

FOREIGN PATENT DOCUMENTS

| | | |
|---|---|---|
| CN | 103198303 A | 7/2013 |
| EP | 1072014 B1 | 11/2004 |
| WO | 2006087581 A1 | 8/2006 |

OTHER PUBLICATIONS

International Search Report and Written Opinion, dated Sep. 2, 2014, in connection with related PCT/US2014/028806 filed Mar. 14, 2014.

\* cited by examiner

*Primary Examiner* — Abolfazl Tabatabai

(74) *Attorney, Agent, or Firm* — Downs Rachlin Martin PLLC

(57) ABSTRACT

In an exemplary embodiment, software made in accordance with the present invention allows for template building, template matching, facial point detection, fitting a 3D face model, and other related concepts. Such techniques can be utilized, for example, in a process for fitting a deformable 3D face model to an image or video containing a face. Various corresponding and related methods and software are described.

33 Claims, 11 Drawing Sheets

SYSTEMS, METHODS, AND SOFTWARE FOR DETECTING AN OBJECT IN AN IMAGE

RELATED APPLICATION

The present invention claims priority to U.S. Provisional Application No. 61/801,788 filed Mar. 15, 2013, which provisional application is incorporated by reference herein in its entirety.

FIELD OF THE INVENTION

The present invention generally relates to the field of image analysis. In particular, the present invention is directed to systems, methods, and software for detecting an object in an image.

BACKGROUND

Face model fitting can allow a range of human to computer interaction applications. Examples of such applications include, but are not limited to, live facial puppetry, facial feature detection, head pose estimation, face tracking, face recognition, facial expression recognition, and any combinations thereof. Prior techniques for face model fitting have several shortcomings, especially when run on lower powered computing devices, such as a mobile device running an ARM processor. Examples of shortcomings of prior techniques include, but are not limited to, intensive training stages, requirements for initial head pose estimation, difficulty tracking 3D movement, difficulty in variations from one person to another, and others.

SUMMARY OF THE DISCLOSURE

It is understood that the scope of the present invention is limited to the scope provided by the independent claims, and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted).

Robust and lightweight methods are presented for detecting an object in an image and, optionally, automatically fitting deformable 3D models to one or more images of the object. In some embodiments, methods described herein can fit a generic model in two steps: (1) the detection of facial features based on local image gradient analysis and (2) the back-projection of a deformable 3D face model through the optimization of its deformation parameters. This approach can retain the advantages of both learning-free and learning-based approaches. Thus, the position, orientation, shape, and movements of objects, such as faces or other objects, can be detected and user-specific face tracking approaches can be initialized. Certain aspects of the invention are particularly suited to detecting objects in challenging illumination conditions and can be used to address semantic inference in object images and/or videos with a computational cost that allows for implementation in devices with meager hardware capabilities, such as smartphones and tablets. Aspects of the present invention allow for template building, template matching, facial point detection, fitting a 3D face model, and other related concepts. Such techniques can be utilized, for example, in a process for fitting a deformable 3D face model to an image or video containing a face.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
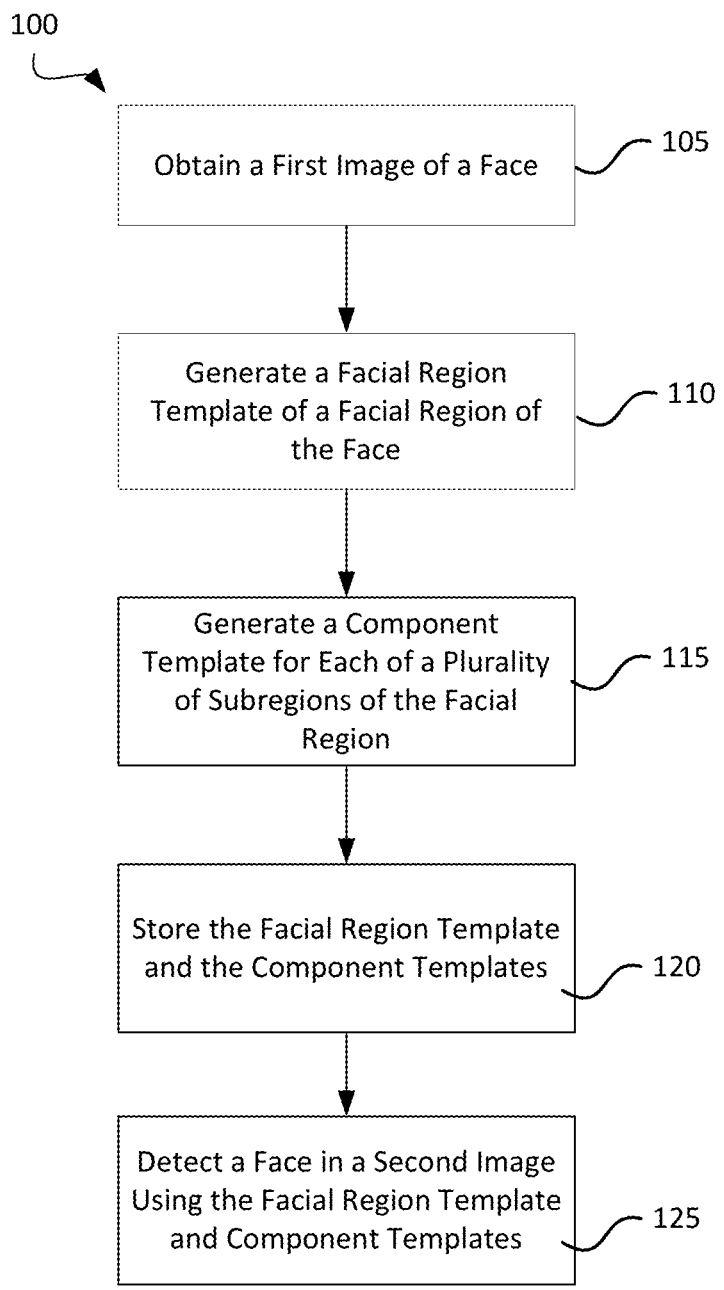
FIG. 1 is a flow diagram illustrating a method of detecting a face in an image according to exemplary aspects of the present invention.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

The present disclosure provides systems and methods for template building, template matching, facial point detection, fitting a 3D face model, and other related concepts. As discussed further below, such techniques can be utilized in a process for fitting a deformable 3D face model to an image or video of a face.

In one implementation, a multi-component template for facial matching is provided. A multi-component template utilizes template components to represent a learned face. Each template component includes information representing a region of the face. For example, this information may be image data for the region represented by the template component. Image data can be in a variety of known image data formats. Additionally, image data may be in any of a variety of known color states. Example color states include, but are not limited to, a full color state, a multi-color state, a monochrome state, a greyscale state, and any combinations thereof. Image data may be referred to herein as an image file. A template component may include one or more image files for the region represented by the template component. In one example, multiple image files may exist as a single file storage unit. In another example, multiple image files may be stored as separate file storage entities and related to each other as a template component using a file management system, such as a database system.

Template components for facial matching can represent any region of the face and nearby regions. Example regions that may be represented by a template component include, but are not limited to, a nose, a left eye, a right eye, a mouth, a left eyebrow, a right eyebrow, a left ear, a right ear, and any combinations thereof. One example of a template component is a facial region template. A facial region template is a template component representing an overall region of the face to be matched. In one example, a facial region template represents a rectangular shape with a width and a height that will define the analysis region for multi-component template building and matching. In one exemplary implementation of a multi-component template, a multi-component template includes a facial region template and a component template for each of one or more subregions of the face that are at least in part within the region of the face represented by the facial region template.

Template components may be associated with each other as a multi-component template in a variety of manners. Example associations include, but are not limited to, template components stored as separate file storage entities and associated with data (e.g., in a file management structure) as a multi-component template, template components stored together as a single file storage entity as a multi-component template, and any combinations thereof.

A multi-component template for facial matching may be utilized to identify a face within an image as the face represented by the multi-component template. In one exemplary aspect, the use of multiple components provides a heightened ability to more accurately match a face within an image as the desired face for application purposes (e.g., for facial tracking, facial masking, etc.).

FIG. 1 illustrates one exemplary implementation of a method 100 for detecting a face within an image. At step 105, a first image including a face is obtained. An image may be obtained in a variety of ways. Example ways to obtain an image include, but are not limited to, use of an imaging device, file transfer from one computing device to another computing device, scanning an image, and any combinations thereof.

In one example, an image including a face is obtained using an imaging device. Examples of an imaging device include, but are not limited to, a still camera, a video camera, a camera associated with a computing device, a 3D camera, a camera associated with a mobile computing device (e.g., a tablet computer, a mobile phone, a wrist computer, etc.), an appropriate arrangement of one or more visual sensors, and any combinations thereof. It is contemplated that the systems and methods of the present disclosure may be implemented using a computing device that is configured with the appropriate hardware and executable instructions to perform the operations of one or more of the concepts discussed herein. In one example, an aspect of many of the concepts discussed is an improvement in facial detection, recognition, tracking, and/or mask fitting on mobile computing devices (e.g., mobile computing devices having lower processing capabilities than more robust computer devices). Improvements in implementation may also be seen in non-mobile-type computing devices. Example computing devices are discussed further below with respect FIG. 16.

Figure 2:
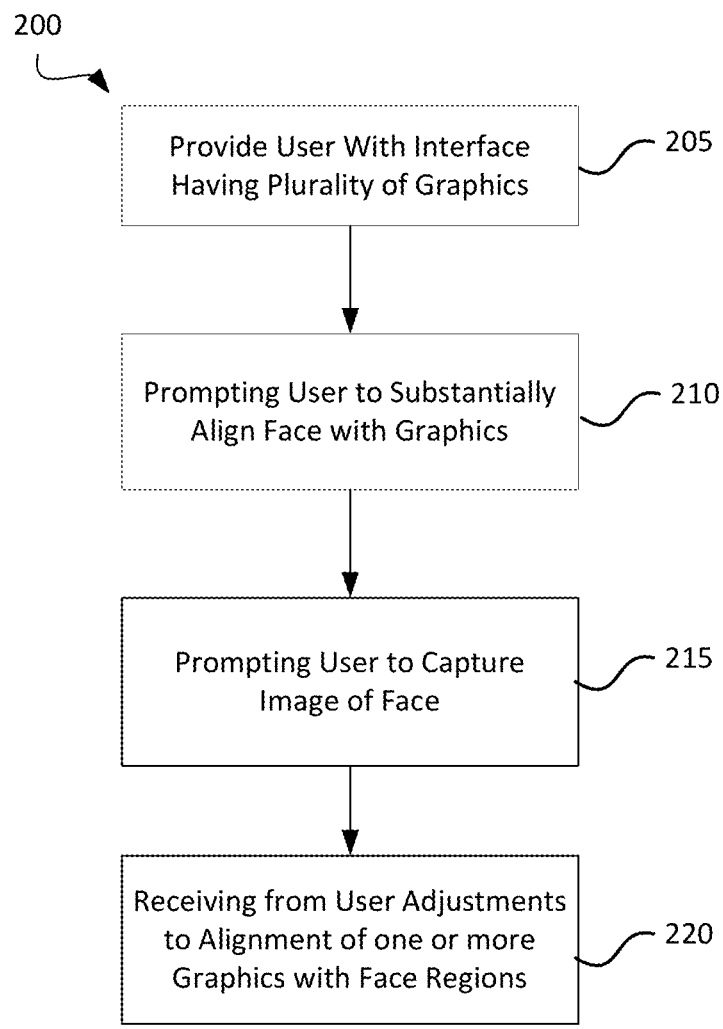
FIG. 2 is a flow diagram illustrating a method of obtaining an image including a face according to exemplary aspects of the present invention.

FIG. 2 illustrates one example of a method for obtaining an image including a face. At step 205, a user is provided with an interface having a plurality of graphics superimposed over an image. In one example, a projection from a camera lens (e.g., a still camera, a video camera) is provided with a plurality of graphic elements over the image projection from the camera. Graphic elements of an interface for obtaining an image can represent regions of a face to assist a user in aligning their face for template building. For example, one or more graphic elements can be provided for regions of a face that will be utilized in building a multi-component template. In one such example, an interface includes an overall facial region graphical element, a left eye region graphical element, a right eye region graphical element, a nose region graphical element, and a mouth region graphical element. A graphical element can have a variety of shapes and configurations. Example shapes include, but are not limited to, a rectangular shape, a shape similar to the region represented by the shape, a circular shape, an oval shape, a triangle shape, other shapes, and any combinations thereof. Example configurations include, but are not limited to, an outlining of a region, a shading of a region, a coloring of a region, and any combinations thereof. The default positioning of graphical elements may be based on a variety of factors. In one example, a default positioning of graphical elements is based on a generic facial model in which the position of certain elements is estimated based on average positioning in human faces.

At step 210, the user is prompted to substantially align their face with the plurality of graphic elements. In one exemplary aspect, this may get the face in a general position for template building. A prompt in an interface can have a variety of configurations. Example configurations of a prompt include, but are not limited to, a text prompt, a graphic prompt, an audio prompt (e.g., voice instructions, musical indications, etc.), a tactile prompt (e.g., a vibration), an indicator light externally visible on a computing device, and any combinations thereof.

At step 215, the user is prompted to capture an image of the face that is substantially aligned with the plurality of graphic elements. In one example, the captured image remains visible in the interface with the graphic element superimposed thereon.

At step 220, the user can make adjustments to the location of the graphical elements with respect to the face regions of the image. Example ways for a user to adjust the location of the graphical elements include, but are not limited to, actuation of a touch screen panel having an interface for template building, use of a computing pointing device (e.g., a mouse) associated with a display having an interface for template building, use of one or more keys of a keyboard associated with a display having an interface for template building, providing one or more verbal commands (e.g., via a microphone associated with an interface for template building), and any combinations thereof.

Figure 3:
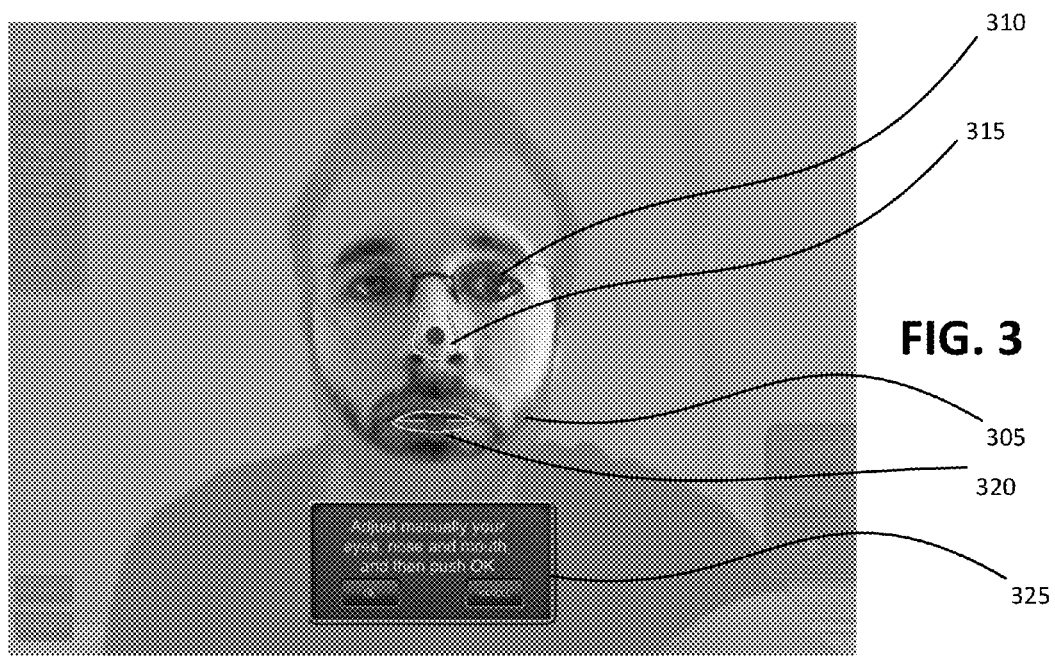
FIG. 3 is a representative screenshot illustrating an exemplary interface for template building.

FIG. 3 illustrates one example of an interface 300 for template building. Interface 300 shows a person's head and face positioned within the field of view. The interface has a shading that reveals a somewhat circular region 305 that is not shaded. Circular region 305 provides graphical element that is a guide for the positioning of the overall facial region. Interface 300 also includes a left eye region graphical element 310 configured as an outline shaped like an eye. A right eye region graphical element is also shown opposite the left eye region graphical element. Interface 300 also includes a nose region graphical element 315 shaped as an outline of a nose and including a circular dot to assist with centering the nose region. Interface 300 also includes a mouth region graphical element 320. After the user substantially aligns the face with the graphical elements and captures an image, interface 300 provides a prompt 325 for the user to manually adjust the positions of the graphical elements for the eyes 310, nose 315, and mouth 320.

Alignment of graphical elements with facial regions can assist with template building by more accurately pointing to the desired regions for each template component. As will be discussed further below, in one example, a template component can include an image of the region of the face represented by the template component. Alignment can assist in ensuring that the proper portions of a user's face fall within the image of the template component (e.g., such that a person's eye is within the boundaries of the image for a template component representing the eye). It is noted that a graphical element of an interface, such as that discussed above with respect to FIGS. 2 and 3, does not have to have the same shape, boundaries, or other configuration parameters as a region that will be represented by a template component. In one example, a template component may represent a region of the face that was aligned by a graphical element in which the graphical element has a different size and shape from the region that will be represented by the template component (e.g., an image may be taken of a region that is larger than an area outlined or otherwise indicated by a graphical element).

Figure 4:
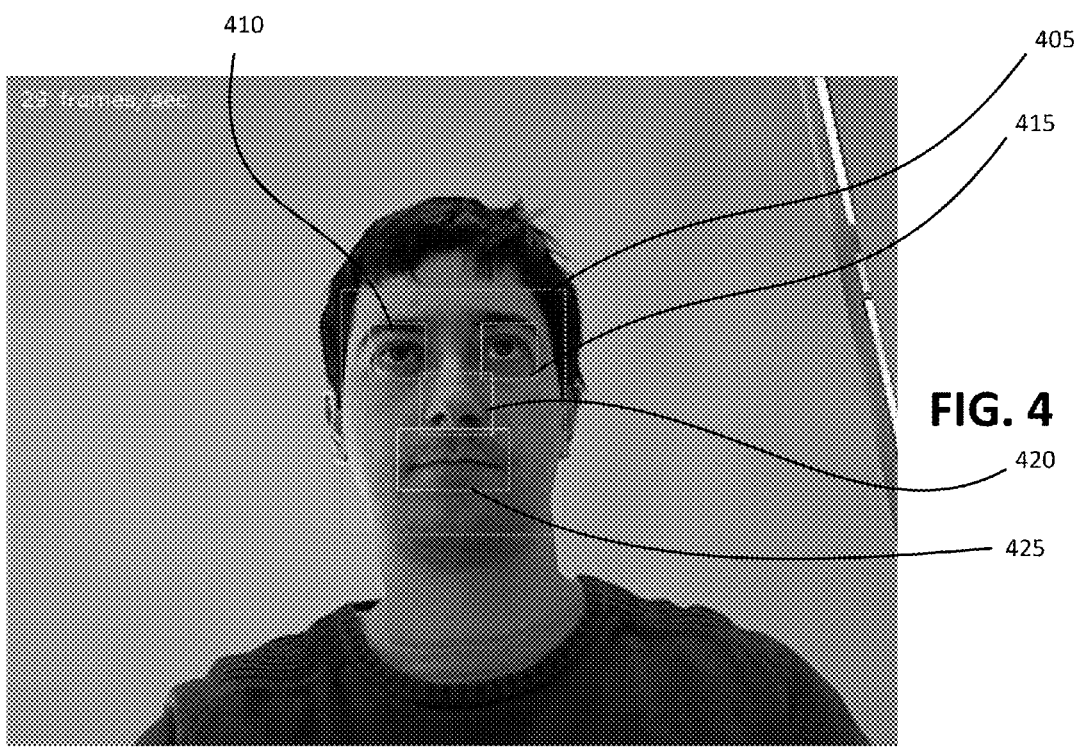
FIG. 4 is a representative screenshot illustrating regions of a face.

Returning to FIG. 1, at step 110, a facial region template is generated. FIG. 4 illustrates one example of a representation of underlying regions of a face outlined with rectangular elements: a general facial region 405, a right eye region 410, a left eye region 415, a nose region 420, and a mouth region 425. These regions may be represented by template components in a multi-component template of the face. In one example, the regions of the face may be aligned in an interface having graphical elements (such as those in FIG. 3) that are different in shape or configuration from the rectangular shapes outlined in FIG. 4. In another example, the regions of the face may be aligned in an interface having graphical elements that are rectangular shapes like the regions of FIG. 4.

A facial region template may be generated representing an overall facial region (such as region 405). In the example of region 405, the region represented by the facial region template is rectangular in shape having a width and a height. In one example, an image file including image data for the region 405 is included in the facial region template. In one such example, the image data is taken from the image captured by a user (such as in step 215 of method 200).

At step 115, a component template is generated for each of a plurality of subregions of the general facial region. In the example in FIG. 4, there are four subregions: right eye region 410, left eye region 415, nose region 420, and mouth region 425. In this example, a component template is generated for each region 410, 415, 420, and 425. In one example, each component template includes an image file having image data from the corresponding region. In one such example, the image data is taken from the image captured by a user (such as in step 215 of method 200).

At step 120, the facial region template and the component templates for subregions are stored. Template components can be stored in a variety of ways. In one example, a template component can be stored on a memory element and/or other machine-readable storage media associated with a computing device (e.g., a computing device configured with hardware and executable instructions for implementing a method for detecting/matching a face within an image, such as method 100). Example memory elements/machine-readable storage media are discussed further below with respect to FIG. 16. The order of storage of template components may vary. In one example, a facial region template can be stored prior to generating the component templates for subregions. In another example, the facial region template and the component templates are generated prior to storage. The template components (including the facial region template and component templates for subregions) can be associated with each other as a multi-component template for facial matching.

At step 125, the facial region template and component templates are used to detect a face in a second image. For example, the multi-component template can be compared against one or more images (e.g., captured by a camera device) to determine whether image data in the new image matches one or more of the template components. In one exemplary aspect, the use of multiple components of the same template may provide greater accuracy in determining that a face in a new image is the same face as that represented by the multi-component template. In another exemplary aspect, the multi-component template may provide an improved representation of a specific face of a specific user as opposed to more generalized models. In one example of comparing the multiple template components to the second image, a confidence value can be utilized to determine how closely the template components as a whole match a region of the second image. Additional detail of procedures for comparing templates to images for matching is provided below (e.g., with respect to FIGS. 7 and 8).

In another implementation, a multi-resolution template for facial matching is provided. A multi-resolution template includes multiple image files in which each of the image files includes image information for the same region of the face. Each of the image files has a different image resolution. A multi-resolution template can have any number of resolution levels at which an image file is generated. For example, an initial image can be obtained during a learning stage for a given face. An image file for a region of the face having a first resolution (e.g., measured by height by width) in the initial image can be obtained. For a multi-resolution template having a resolution scale with n resolution levels, an image file at the first resolution and n−1 number of additional image files each at a different resolution can be included in the multi-resolution template. Procedures for upscaling and downscaling images are well known. In one such example, a multi-resolution template may have a total of five resolution levels in a resolution scale. This multi-resolution template would have an image file for the initial resolution and four additional image files, each of a different resolution.

Different image resolutions can be part of an image resolution scale. The difference between resolution levels in a scale can be any difference. In one example, the distance between resolution levels in a scale is the same for each resolution level. In another example, the distance between resolution levels is different. A resolution scale may have any overall size. In one example, a resolution scale is bound by a maximum resolution level and a minimum resolution level. In one such example, the maximum and minimum resolutions are determined based on the number of levels in a resolution scale and the resolution of the initial image of the face. In one exemplary aspect, a multi-resolution template may provide for matching a face in an image where the distance between the face and an imaging device is not constant and in other circumstances, for example, by providing multiple images of multiple resolutions produced by imaging devices located at two or more differing distances from a user.

Figure 5:
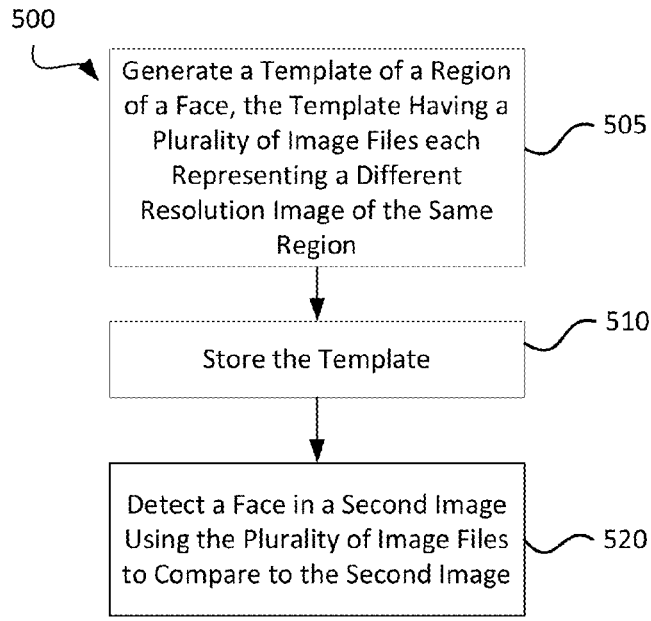
FIG. 5 is a flow diagram illustrating a method of matching a face to a multi-resolution template according to exemplary aspects of the present invention.

FIG. 5 illustrates an example method 500 of matching a face to a multi-resolution template. At step 505, a template is generated for a region of a face. The template includes a plurality of image files, each of which representing the same region of the face with a different resolution image. At step 510, the plural image files are stored as the template for that region. The order of storage of the image files can be any order that works for a given situation. In one example, the image files are stored and/or combined as they are generated. In another example, the image files are all generated prior to storing and/or combining any of the image files. At step 515, the template and the multiple image files are used to detect a face in a second image. In one example, the comparing of the second image to the image files of the template is done one image file at a time starting with the highest resolution image file in the template and working down in resolution until a match is found. In another example, the comparing the second image to the image files of the template is done one image file at a time starting with the lowest resolution image file in the template and working up in resolution until a match is found.

Figure 6:
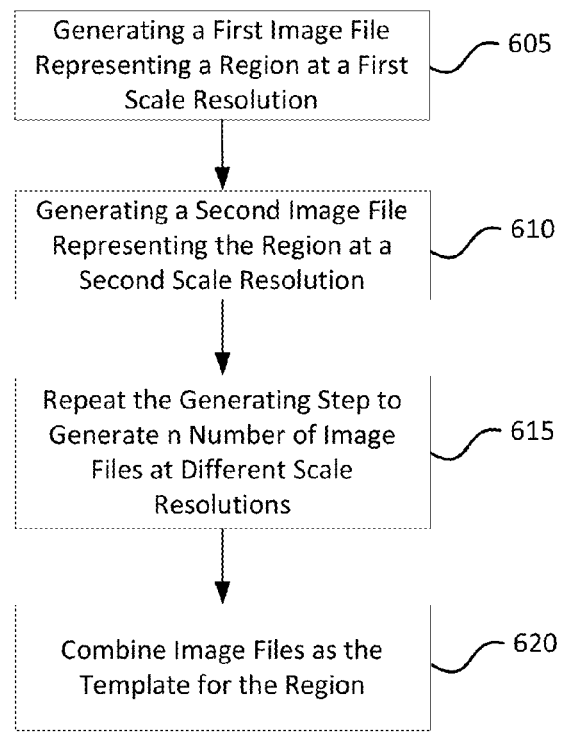
FIG. 6 is a flow diagram illustrating a method of building a multi-resolution template for facial matching according to exemplary aspects of the present invention.

FIG. 6 illustrates another example method 600 of building a multi-resolution template for facial matching. At step 605, a first image file representing a region at a first scale resolution is generated. At step 610, a second image file representing the same region at a second scale resolution is generated. At step 615, the generating step is repeated to generate n number of image files at different scale resolutions. In one example, the number n of image files/resolution levels is a predetermined value. At step 620, the n image files are combined as the template for the region.

A multi-resolution template may also be a multi-component template. In one example of a multi-resolution, multi-component template, each of the template components of the template includes a plurality of image files representing the same region of the face with each of the image files having a different resolution.

In another example, a minimum resolution, a maximum resolution, and a desired number of scale resolution increments (i.e., resolution levels) for a resolution scale for a facial region template are determined. Various factors can be utilized to determine these values including, but not limited to, the resolution capabilities of the imaging device used to take images, the range of distances a subject may be from the lens of an imaging device used to take images, typical lighting conditions for facial matching, processing power for a computing device utilized for facial template building and matching, other factors, and any combinations thereof. A first image file is generated at the resolution of the initial template-building image region for the facial region. Additional image files for the facial region up to the desired number of scale resolution increments are generated each at a different resolution increment in the scale from the minimum resolution to the maximum resolution. The image files for the facial region are combined to form the facial region template. A minimum resolution, a maximum resolution, and a desired number of scale resolution increments for a resolution scale for each of the component templates in a multi-component template are determined. A first image file is generated at the resolution of the initial template building image region for the corresponding component template. Additional image files for each component template up to the desired number of scale resolution increments are generated each at a different resolution increment in the scale from the minimum resolution to the maximum resolution. The image files for each component template region are combined to form the corresponding component template.

In yet another example, for each of the template components (including a facial region template and component templates) of a multi-component, multi-resolution template, a minimum resolution, a maximum resolution, and a desired number of scale resolution increments (nLevels) are determined. If the desired number of scale resolution increments is one, then, for each of the template components, a first image file representing the corresponding region for the template component is generated at the resolution of the corresponding region of the initial image of the face. If the desired number of scale resolution increments is two, then, for each of the template components, the following are generated: (a) a first image file representing the corresponding region for the template component at the first resolution of the corresponding region of the initial image of the face, and (b) a second image file representing the same region at a second resolution that is different from the first resolution. In one example, the second resolution is below the resolution of the first resolution (i.e., a downscale). In another example, the second resolution is above the resolution of the first resolution (i.e., an upscale). If the desired number of scale resolution increments is 3, for each of the template components the following are generated: (a) a first image file representing the corresponding region for the template component at the first resolution of the corresponding region of the initial image of the face, (b) a second image file that is a downscale from the first resolution, and (c) a third image file that is an upscale from the first resolution. If the desired number of scale resolution increments is greater than three, then, for each of the template components, the following are generated: (a) a first image file representing the corresponding region for the template component at the first resolution of the corresponding region of the initial image of the face, (b) a second number of image files that are a downscale from the first resolution, and (c) a third number of image files that are an upscale from the first resolution. In one example, the second number of image files is determined by calculating "(nLevels−1)/(maxScale−minScale)*(1−minScale)" and the third number of image files is determined by calculating "nLevels−nDownscales−1," wherein nLevels is the desired number of scale resolution increments, maxScale is the maximum scaling factor, minScale is the minimum scaling factor, and nDownscales is the second number of image files. The scale for each downscale image file in each of the template components is determined by:

$$j=0 \rightarrow n\text{Downscales}-1$$

$$\text{scale} \leftarrow \text{minScale}+(\text{maxScale}-\text{minScale})/n\text{Levels}*j$$

and the scale for each of the upscaled image files is determined by:

$$j=0 \rightarrow n\text{Upscales}-1$$

$$\text{scale} \leftarrow \text{maxScale}+(\text{minScale}-\text{maxScale})/n\text{Levels}*j$$

wherein nDownscales is the number of downscale image levels, nUpscales is the number of upscale image levels, minScale is the minimum scale factor, maxScale is the maximum scale factor, and nLevels is the desired number of scale resolution increments.

In still another example, Table 1 illustrates another multi-component, multi-resolution template learning process wherein: faceROI is the general facial region initial image file, lEyeROI is the left eye region initial image file, rEyeROI is the right eye region initial image file, noseROI is the nose region initial image file, mouthROI is the mouth region initial image file, nLevels is the number of desired resolution scale levels, minSize is the minimum resolution on the resolution scale, maxSize is the maximum resolution on the resolution scale, I is the image of the face, minScale is the minimum scaling factor, maxScale is the maximum scaling factor, the min function takes the minimum value of the two values being compared, the max function takes the maximum value of the two values being compared, nDownscales is the number of downscales, T is a template, $T_c$ is a template component, $T_{mcmr}$ is a multi-component, multiresolution template.

TABLE 1

Multi-component multi-resolution template learning procedure

1: procedure MCMRTemplateLearning( I, faceROI, lEyeROI, rEyeROI, noseROI, mouthROI, nLevels, minSize, maxSize )
2:     minScale ← max(minSize/ faceROI$_{width}$, minSize/ faceROI$_{height}$)
3:     maxScale ← min(maxSize/ faceROI$_{width}$, maxSize/ faceROI$_{height}$)
4:     if nLevels == 2 then
5:        nDownscales = 1
6:        nUpscales = 0
7:     else if nLevels == 3 then
8:        nDownscales = 1
9:        nUpscales = 1
10:    else if nLevels > 3 then
11:       nDownscales = (nLevels − 1)/(maxScale − minScale) · (1 − minScale)
12:       nUpscales = nLevels − nDownscales − 1
13:    else
14:       nDownscales = 0
15:       nUpscales = 0
16:    end if
17:    ($T_{mc} = T_{face} \wedge T_{lEye} \wedge T_{rEye} \wedge T_{nose} \wedge T_{mouth}$) ← Get templates from (I $\wedge$ faceROI $\wedge$ lEyeROI $\wedge$ rEyeROI $\wedge$ noseROI $\wedge$ mouthROI)
18:    for each component in $T_{mc}$ do
19:       for j = 0 → nUpscales−1 do
20:          scale ← maxScale + (minScale − maxScale)/nLevels · j
21:          Resize $T_c$ with scale and store in $T_{mcmr}$
22:       end for
23:       Store current $T_c$ in $T_{mcmr}$
24:       for j = 0 → nDownscales−1 do
25:          scale ← minScale + (maxScale − minScale)/nLevels · j
26:          Resize $T_c$ with scale and store in $T_{mcmr}$
27:       end for
28:    end for
29:    return $T_{mcmr}$ In one example of the procedure set forth in Table 1, where a minSize is 200, a maxSize is 800, nLevels is 4, and image resolution is 600×400:

minScale=max(minSize/faceROI$_{width}$, minSize/faceROI$_{height}$)=max(200/600, 200/400)=max(0.333, 0.5)=0.5 maxScale=min(maxSize/faceROI$_{width}$, maxSize/faceROI$_{height}$)=min(800/600, 800/400)=min(1.333, 2)=1.333 nDownscales=(nLevels−1)/(maxScale−minScale)*(1−minScale)=(4−1)/(1.333−0.5)*(1−0.5)=3/0.833*0.667=2.40=2(rounded to nearest integer number)

nUpscales=nLevels−nDownscales−1=4−2−1=1

In this example, with two downscales, one upscale, and one initial file, maximum resolution in the scale will be 1.333*600×400=800×533 and minimum resolution in the scale will be 0.5*600×400=300×200, as shown below.

Upscales:

(j=0)→scale=maxScale+(minScale−maxScale)/nLevels*0=1.333→resolution=1.333*(600×400)=800×533

Downscales:

(j=0)→scale=minScale+(maxScale−minScale)/nLevels*0=0.5→resolution=0.5*(600×400)=300×200

(j=1)→scale=minScale+(maxScale−minScale)/nLevels*1=0.5+(1.333−0.5)/4=0.70825→resolution=0.70825*(600×400)=425×283

No-scale: 600×400

As discussed above, a template (such as a multi-component template, a multi-resolution template, or a multi-component, multi-resolution template) can be compared to an image to determine if the image includes a face represented by the template. In one example, a template image (e.g., a first resolution image file of a template component) is compared to the subject image, which may contain a face, by moving the template image across the subject image (e.g., one pixel at time) and comparing the images at each location of overlap. In one such example, a metric can be calculated to determine how closely the template image matches the subject image at each location. For example, for an image, I, having a width W and height H and a template image, T, having a width w and height h, each location match metric can be stored in a result image, R, of width (W−w+1) and height (H−h+1), where the brightest locations indicate the highest matches, which may indicate a tentative match location of T. There are different metrics that can be applied. In one example, a normalized correlation coefficient such as that in J. P. Lewis, *Fast normalized cross-correlation*, Vol. 1995, Citeseer, 1995, pp. 120-123, URL http://www.mendeley.com/research/fast-normalized-crosscorrelation/, which is incorporated herein by reference in its entirety, can be utilized. In another example, equation (1) below can be utilized:

$$R(x, y) = \frac{\sum_{x',y'} (T'(x', y') \cdot I'(x + x', y + y'))}{\sqrt{\sum_{x',y'} T'(x', y')^2 \cdot \sum_{x',y'} I'(x + x', y + y')^2}} \quad (1)$$

wherein x'=1, . . . , w; y'=1, . . . , h; T'(x',y')=T(x',y')−1/(w·h)·$\Sigma_{x'',y''}$T(x",y"); and I'(x+x', y+y')=I(x+x', y+y')−1/(w·h)·$\Sigma_{x'',y''}$I(x+x', y+y').

Figure 7:
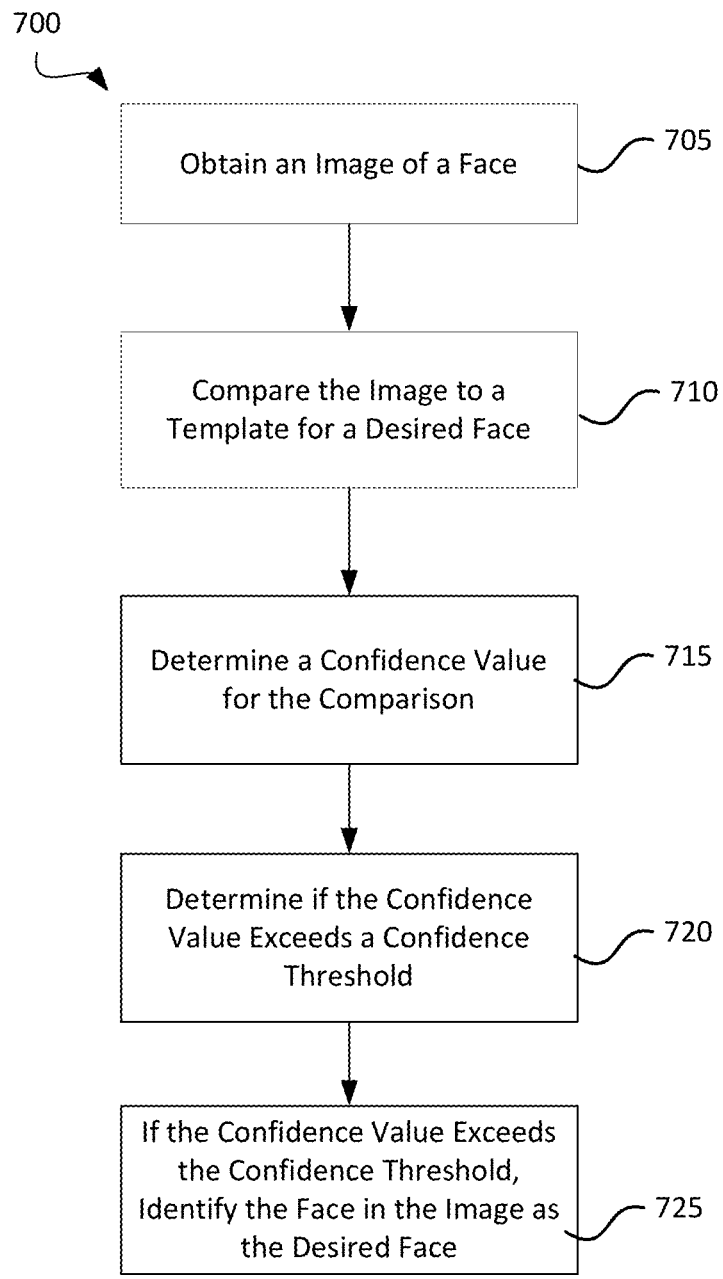
FIG. 7 is a flow diagram illustrating a method of matching a template to an image to determine the presence of a face in the image according to exemplary aspects of the present invention.

FIG. 7 illustrates one example of a method 700 for matching a template to an image to determine the presence of a desired face in the image. At step 705, an image that possibly includes a face for detection is obtained ("subject image"). At step 710, the image is compared to a template for a desired face. In one example, the comparison includes comparing the image data of the template to the subject image. In one such example, the comparison is done by sliding the template image across the subject image one pixel at a time and comparing the image data. In another such example, a gradient analysis can be utilized in the comparison. At step 715, a confidence value for the comparison is determined. In one example, the confidence value is a metric giving a quantitative indication of the level of positive match for the template image to the subject image. At step 720, the confidence value is compared against a confidence threshold to determine whether the template matches the subject image at a desired level of confidence for a match. In one example, equation (1) can be used as a confidence value/threshold test to determine whether a match meets a confidence level. At step 725, if the confidence level exceeds the confidence threshold, the face in the subject image is identified as a match for the desired face associated with the template. The steps of method 700 can be repeated for multiple template image files of different resolutions for the same region of a face. In one such example, a positive identification may depend on matching more than one template image file to the subject image at a predetermined threshold value. In another such example, different threshold values may apply to different resolution levels. The steps of method 700 can also be repeated for multiple components of a template. In one such example, a positive identification may depend on matching more than one template component to the subject image at a predetermined threshold value. In another such example, different threshold values may apply to different template components.

Figure 8:
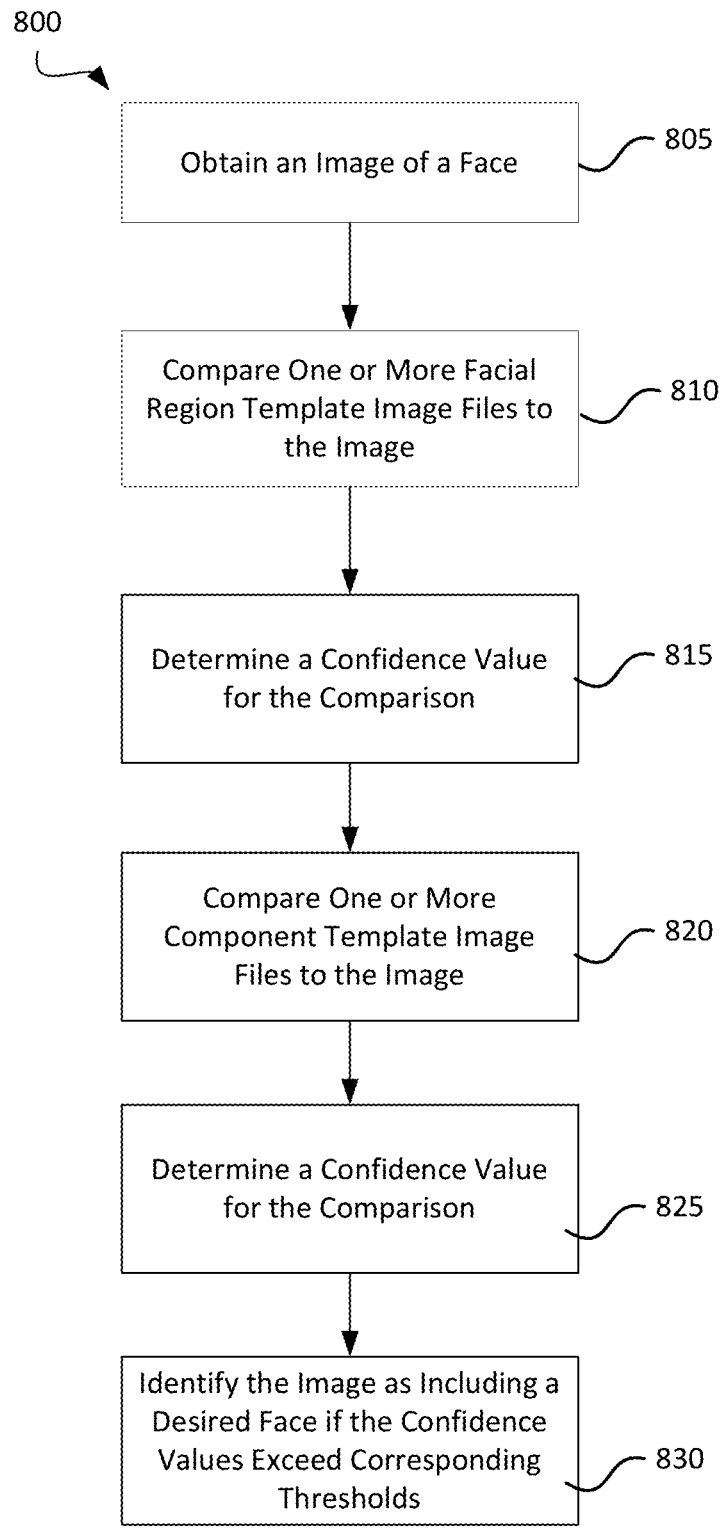
FIG. 8 is a flow diagram illustrating another method of matching a template to an image to determine the presence of a desired face in the image according to exemplary aspects of the present invention.

FIG. 8 illustrates another example of a method 800 for matching a template to an image to determine the presence of a desired face in the image. At step 805, an image that possibly includes a face for detection is obtained ("subject image"). At step 810, one or more image files of a facial region template are compared against the subject image. In one example, multiple resolution image files for the general facial region in the facial region template are each compared against the subject image. At step 815, a confidence value for the comparison is determined. At step 820, one or more component template image files are compared to the subject image. In one example, multiple resolution image files for each of the one or more component templates are each compared against the subject image. At step 825, a confidence value for the comparison in step 820 is determined. At step 830, a face within the subject image is identified as matching the desired face represented by the template components if the confidence values exceed corresponding thresholds. In one example, equation (1) can be used as a confidence value/threshold test to determine if a match meets a confidence level.

Table 2 illustrates one example of a procedure for comparing a multi-component, multi-resolution template to a subject image. Generally, the procedure starts at high resolution for each template component and compares the template component ($T_c$) for the FaceROI (facial region template). This is done using a threshold value (thresh) to compare the results of the scan. If the comparison has a confidence that exceeds the threshold, it is a match. One example threshold technique involves using Eq. 1. If the threshold is not exceeded at that resolution comparison, then the next lowest resolution is compared, and so on, until there is a match that exceeds the threshold. Once there is a match for the faceROI, the process goes on to the other component templates, compares the $T_c$ at the matched resolution to the image, and compares the result against a threshold. If the thresholds are exceeded in each $T_c$ comparison, there is confidence that the right face has been detected.

TABLE 2

Multi-component multi-resolution template matching procedure

Figure 9:
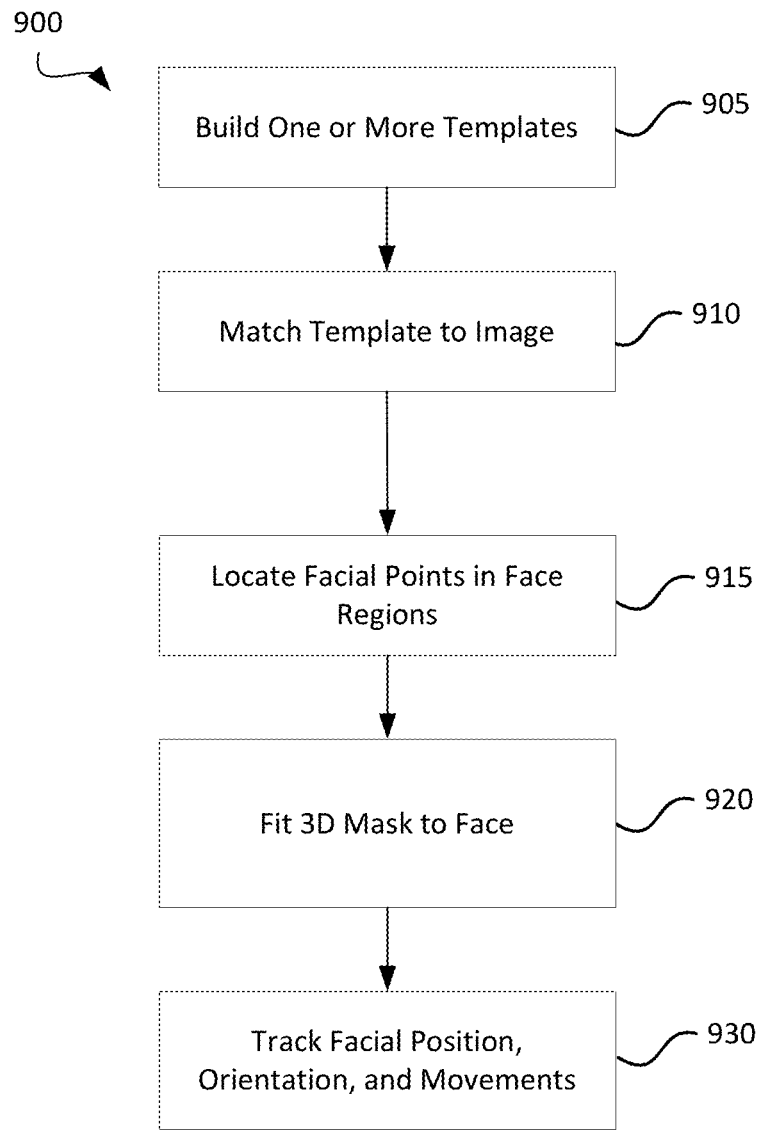
FIG. 9 is a flow diagram illustrating a method of fitting a 3D mask to a face matched to a template according to exemplary aspects of the present invention.

1: procedure MCMRTemplateMatching( I, $T_{mcmr}$, $thresh_c$, $thresh_p$ )
2:    prevMatchVal = 0
3:    faceDetected = false
4:    prevLevelDetected = false
5:    for each resolution in $T_{mr}^{face}$ do TABLE 2-continued Multi-component multi-resolution template matching procedure 6:       levelMatchVal ∧ faceROI ∧ (levelDetected = levelMatchVal > $thresh_c$ ? true:false) ← Detect $T_r^{face}$ on I according to Eq. 1
7:       if levelMatchVal > prevMatchVal then
8:          faceDetected = levelDetected
9:          searchLevel = resolution
10:      else if prevLevelDetected then
11:         break
12:      end if
13:      prevMatchVal = levelMatchVal
14:      prevLevelDetected = levelDetected
15:    end for
16:    if faceDetected then
17:       lEyeROI ∧ (lEyeDetected = lEyeMatchVal > $thresh_p$ ? true:false) ← Detect $T_{searchLevel}^{lEye}$ on the upper left part of faceROI according to Eq. 1
18:       rEyeROI ∧ (rEyeDetected = rEyeMatchVal > $thresh_p$ ? true:false) ← Detect $T_{seachLevel}^{rEye}$ on the upper right part of faceROI according to Eq. 1
19:       noseROI ∧ (noseDetected = noseMatchVal > $thresh_p$ ? true:false) ← Detect $T_{seachLevel}^{nose}$ on the middle part of faceROI according to Eq. 1
20:       mouthROI ∧ (mouthDetected = mouthMatchVal > $thresh_p$ ? true:false) ← Detect $T_{seachLevel}^{mouth}$ on the bottom part of faceROI according to Eq. 1
21:    end if
22:    faceDetected = faceDetected ∧ lEyeDetected ∧ rEyeDetected ∧ noseDetected ∧ mouthDetected
23:    return (faceDetected ∧ faceROI ∧ lEyeROI ∧ rEyeROI ∧ noseROI ∧ mouthROI)
24: end procedure FIG. 9 illustrates one example of a method 900 for fitting a 3D mask to a face matched to a template. At step 905, one or more templates for matching a face in an image are generated. Multiple methods for template building are discussed above. At step 910, the one or more templates are matched to a subject image for a face in the subject image. Multiple methods for template matching are discussed above. With a face detected, a tracking procedure and mask fitting can take place. If face detection fails, step 910 can be repeated to recapture the face in an image. With one or more of the improvements discussed above, such a recapture may be more efficient than in prior methods.

At step 915, one or more facial points in face regions are detected. Many processes for detecting facial points are possible. Example facial points include, but are not limited to, a left eye left corner, a left eye upper corner, a left eye right corner, a left eye lower corner, a left eye center, a left eyebrow left corner, a left eyebrow upper corner, a left eyebrow right corner, a right eye left corner, a right eye upper corner, a right eye right corner, a right eye lower corner, a right eye center, a right eyebrow left corner, a right eyebrow upper corner, a right eyebrow right corner, a mouth left corner, a mouth upper corner, a mouth right corner, a mouth lower corner, a nose top, a nose base, a left nostril, a right nostril, a forehead center, a left cheek, a right cheek, a left facial upper corner, a left facial lower corner, a right facial upper corner, a right facial lower corner, a chin bottom, and any combinations thereof. Example processes for facial point detection include, but are not limited to, an active shape model, an active appearance model, a constrained local model, an active orientation model, a globally optimized tree shape model, a sliding windows-based facial feature point detector, a Gabor facial point detector, a deformable part model, a corner detector, a histogram of oriented gradients, a geometric prior model, a regression-based method, and any combinations thereof. Example active shape models are described in T. F. Cootes, C. J. Taylor, Active shape models—smart snakes, in: BMVC, 1992, pp. 266-275 an T. F. Cootes, C. J. Taylor, D. H. Cooper, J. Graham, Active shape models—their training and application, ComputerVision and Image Understanding 61 (1995) 38-59, each of which is incorporated herein by reference in their entirety. Examples of active appearance models are described in T. F. Cootes, G. V. Wheeler, K. N. Walker, C. J. Taylor, View-based active appearance models, Image and Vision Computing 20 (9-10) (2002) 657-664 and I. Matthews, S. Baker, Active appearance models revisited, International Journal of Computer Vision 60 (2004) 135-164, each of which is incorporated herein by reference in its entirety. Examples of a constrained local model are described in D. Cristinacce, T. F. Cootes, Feature detection and tracking with constrained local models, in: EMCV, 2004, pp. 929-938 and J. M. Saragih, S. Lucey, J. Cohn, Face alignment through subspace constrained mean-shifts, in: International Conference of Computer Vision (ICCV), 2009, each of which is incorporated herein by reference in its entirety. An example of a parts-based tree shape model is described in X. Zhu, D. Ramanan, Face detection, pose estimation, and landmark localization in the wild, in Computer Vision and Pattern Recognition, 2012, which is incorporated herein by reference in its entirety. An example of an active orientation model is described in G. Tzimiropoulos, J. Alabort-i Medina, S. Zafeiriou, M. Pantic, Generic active appearance models revisited, in: Asian Conference on Computer Vision, 2012, which is incorporated herein by reference in its entirety.

Another example procedure for detecting facial points includes detecting a number of facial points (e.g., 30 or more total facial points) by estimating in total the corresponding regions (which do not necessarily correspond to fiducial markers, but to facial landmarks) that allow initialization of a 3D model in such a way that an online appearance model can adjust the 3D model on subsequent frames with a visually alike correlation between the model and the face images. In one example, this procedure can be especially useful in the case of contour points, which can help in initialization but do not match with real landmarks that can always be determined with full certainty on a face image. Once a face is detected as described above, facial point positions are determined (e.g., in some cases even where there may be occlusions, such as glasses or hair).

Table 3 illustrates an initialization process for facial point detection. In one example, the eye points are estimated, then the eyebrows, then the mouth, then the nose and finally the contour points. The eye point positions and the face projection roll angle θ can be derived in a proportional and fixed way from the geometry of the related ROIs ("regions of interest"/ regions of the face). For the estimation of the facial points in eyebrows, mouth, and nose, their corresponding ROI boundaries are used as a reference in fixed way. In one example, these boundaries can be obtained through the procedures in Tables 4, 5 and 6, taking into account also the influence of roll angle θ. The eyebrow ROIs correspond to the upper regions in faceROI above their respective eyeROIs. In one alternative example, as there can be people with bangs occluding the eyebrow regions, or even no eyebrows for some, calculations for the boundaries in the X direction can be omitted. In such an example, the values in the X direction for boundaries can be fixed according to the search region width and the expected eyebrow geometry in the 3D model.

A double sigmoidal filtering can be applied to the search region. This can allow reduction of the influence of directional illumination, while the squared sigmoidal gradient calculation may accentuate the likely edges, and get rid of the edge direction information, showing only the edge strength. In an alternative example, the estimation of the contour point positions can be done in a fixed way also, taking into account the eye and mouth positions. In the case of the side contour points estimation, the image region that goes from the facial region boundary to its corresponding mouth corner is analyzed, assuming that a noticeable X gradient appears in that region, in one of the sides but not in the other, when the person has a half-profile pose, which corresponds to the face side boundary. For this, the squared sigmoidal gradient in X can be calculated, and an assumption can be made as to the location of those side points on the gradient. These side points allow better estimation of the pitch angle of the face. However, there might be cases in which both sides have a noticeable gradient in X, which may correspond not only to the face side boundary but also to other features, such as a beard, or local shadows. In one example, these cases can be filtered by utilizing a determination that the side that should take into account the gradient to estimate the X positions will be that in which the mean positions are closer to the face region boundary, while in the other side the X positions will be those of the boundary itself.

Figure 10:
FIG. 10 is a representative screenshot illustrating an exemplary eye points detection.
Figure 11:
FIG. 11 is a representative screenshot illustrating an exemplary eyebrow points detection.
Figure 12:
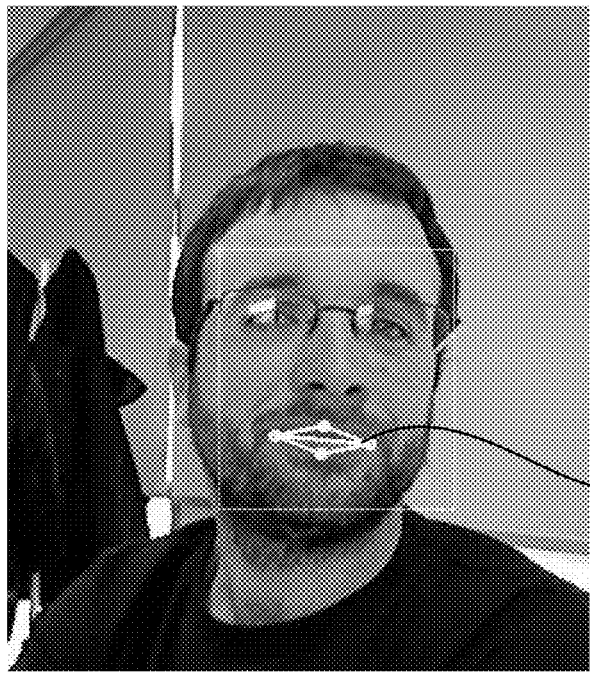
FIG. 12 is a representative screenshot illustrating an exemplary mouth points detection.
Figure 13:
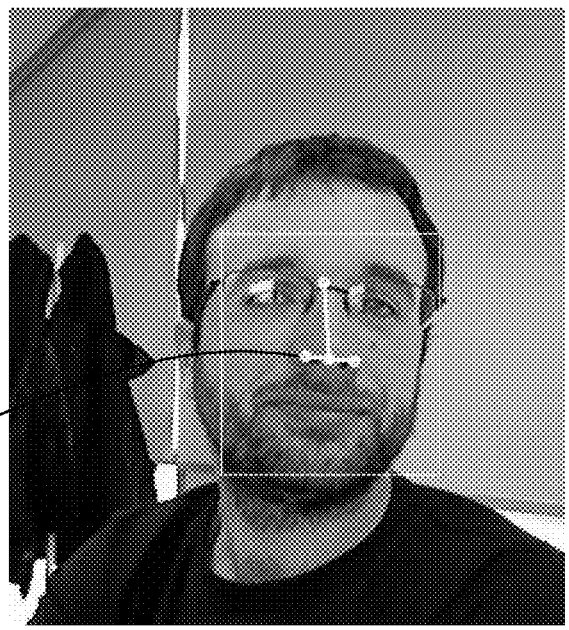
FIG. 13 is a representative screenshot illustrating an exemplary nose points detection.
Figure 14:
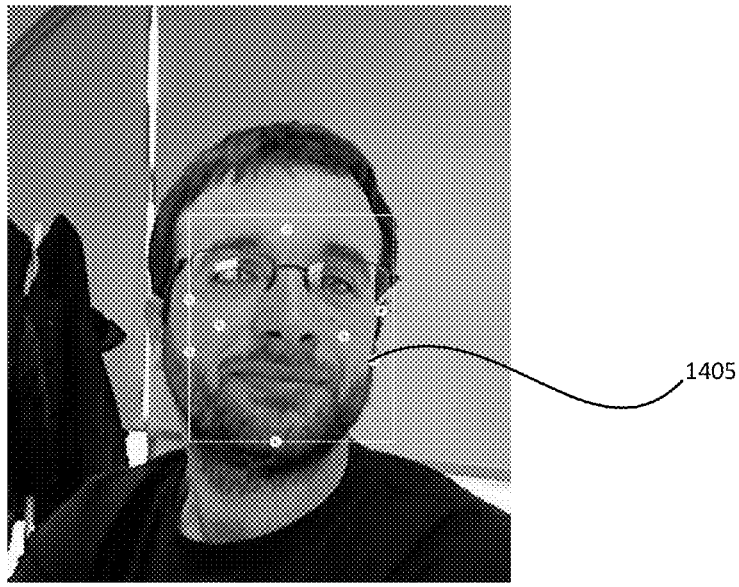
FIG. 14 is a representative screenshot illustrating an exemplary contour points detection.
Figure 15:
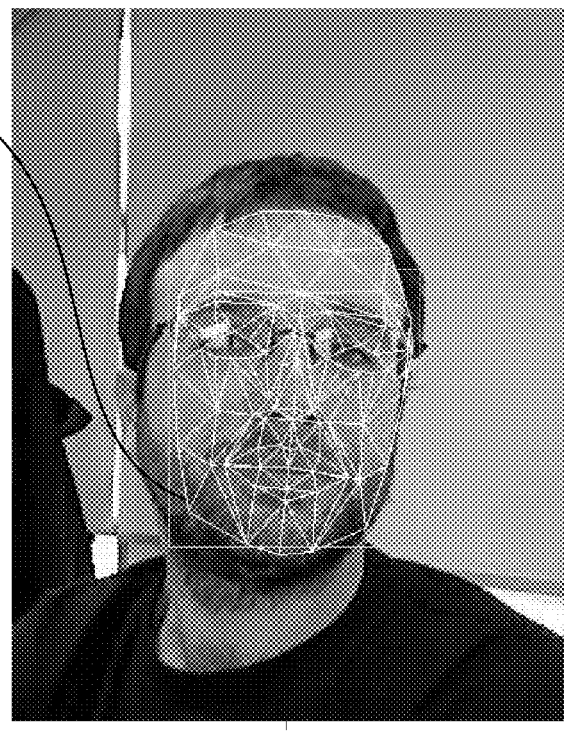
FIG. 15 is a representative screenshot illustrating an exemplary face model fitting on detected facial points.

FIGS. 10 to 15 illustrate exemplary facial point detection and estimation of boundaries for various facial regions. FIG. 10 illustrates exemplary eye point detections 1005. FIG. 11 illustrates exemplary eyebrow points detection 1105. FIG. 12 illustrates mouth points detection 1205. FIG. 13 illustrates nose points detection 1305. FIG. 14 illustrates contour points detection 1405. FIG. 15 illustrates face model fitting on detected facial points 1505.

TABLE 3

Lightweight facial point detection procedure

1: procedure FacialPointDetection( faceROI, lEyeROI, rEyeROI, noseROI, mouthROI, peak-ValX, peakValY )
2: ( eyePoints ∧ θ ) ← EyePointDetection( lEyeROI, rEyeROI, peakValX, peakValY )
3: eyebrowPoints ← EyebrowPointDetection( faceROI, lEyeROI, rEyeROI, peakValY, θ )
4: mouthPoints ← MouthPointDetection( mouthROI, peakValX, peakValY, θ )
5: nosePoints ← NosePointDetection( noseROI, peakValX, peakValY, θ )
6: contourPoints ← ContourPointDetection( faceROI, lEyeCenters, mouthCorners, θ )
7: return eyePoints ∧ eyebrowPoints ∧ mouthPoints ∧ nosePoints ∧ contourPoints
8: end procedure

TABLE 4

Facial Part boundaries detection procedure

1: procedure FPartBoundDetection( fPartROI, peakValX, peakValY )
2: dsFPartROI ← Apply double sigmoidal filter to fPartROI
3: ssyFPartROI ← Apply squared sigmoidal Y gradient to dsFPartROI
4: ( bottomY ∧ topY ) ← YBoundDetection( ssyFPartROI, peakValY )
5: ( leftX ∧ rightX ) ← XBoundDetection( ssyFPartROI, peakValX, bottomY, topY )
6: return (leftX ∧ rightX ∧ bottomY ∧ topY )
7: end procedure

TABLE 5

Facial Part Y boundaries detection procedure

1: procedure YBoundDetection( ssyFPartROI, peakValY )
2:   for each row in ssyFPartROI do
3:     w ← Calculate linear weight, with peakValY value in the middle row and 0 in the extremes
4:     wVertProj$_{row}$ ← (w × $\Sigma_{x-1}^{width}$ ssyFPartROI$_x$)
5:   end for
6:   maxLowY ← Locate the local maximum above peakValY with the lowest position in wVertProj
7:   topY ← (maxLowY + ssyFPartROI$_{height}$ /4)
8:   bottomY ← (maxLowY − ssyFPartROI$_{height}$ /4)
9:   return (bottomY ∧ topY)
10: end procedure

TABLE 6

Facial Part X boundaries detection procedure

1: procedure XBoundDetection( ssyFPartROI, bottomY, topY, peakValX )
2:   for each col in ssyFPartROI do
3:     w ← Calculate linear weight, with peakValX value in the middle col and 0 in the extremes
4:     wHorProj$_{col}$ ← (w × $\Sigma_{bottomY}^{topY}$ ssyFPartROIy)
5:   end for
6:   (leftX ∧ rightX) ← Locate the first value above peakValX starting from the left and right sides in wHorProj
7:   return ( leftX ∧ rightX )
8: end procedure

TABLE 7

Deformable model backprojection procedure

1:   procedure ModelBackprojection( d, w, M, $\bar{g}$, S, A, b )
2:     (g$^{init}$ ∧ b$^{init}$ ) ← Apply POS algorithm (Pose from Orthography and Scaling) to $\bar{g}$ with d
3:     (g ∧ b) ← Starting from (g$^{init}$ ∧ b$^{init}$ ), minimize Eq. 5 through Levenberg-Marquardt algorithm, taking into account Eq. 4 for the update in the iterative optimization process
4:     return (g ∧ b )
5:   end procedure At step 920 of FIG. 9, a 3D mask is fit to the face model. In some embodiments, a face-matching system or other system may display the result of fitting the 3D mask to the face model to a user. An example of 3D mask deformable model backprojection is now described. In one example, at step 930, once facial points have been located on the image, the next stage is to determine which position, orientation, shape units, and animation units fit them the best. The 3D face model is given by the 3D coordinates of the vertices $P_i$, i=1, . . . , n, where n is the number of vertices. The shape, up to a global scale, can be fully described by the 3n-vector g, the concatenation of the 3D coordinates of all vertices (Eq. 2), where $\bar{g}$ is the standard shape of the model, the columns of S and A are the shape and animation units, and $\tau_s \in \mathbb{R}^m$ and $\tau_a \in \mathbb{R}^k$ are the shape and animation control vectors, respectively. The configuration of the 3D generic model is given by the 3D face pose parameters (three rotations and three translations) and the shape and animation control vectors, $\tau_s$ and $\tau_a$. This is given by the vector b (Eq. 3).

$$g = \bar{g} + S\tau_s + A\tau_a \quad (2)$$

$$b = [\theta_x, \theta_y, \theta_z, t_x, t_y, t_z, \tau_s, \tau_a]^T \quad (3)$$

A shape unit provides a way to deform the 3D model in order to adapt inter-person parameters, such as eye width, eye separation distance, etc. The term $S\tau_s$ accounts for shape or inter-person variability, while the term $A\tau_a$ accounts for facial or intra-person animation. In one example, for face tracking, the shape units would remain constant while the animation units could vary, and for the initial face fitting it would be the opposite for different faces with the same facial expression. It is challenging to separate perfectly both kinds of variability in a generic face model that will fit any kind of human face, as the neutral facial expression can be different from person to person. As such, the initialization process takes into account both the shape and animation units, without making a distinction between them. Then, after the initialization, during the tracking stage, the shape units remain constant and only a subset of the animation units may be considered in order to reduce the computational work.

In Eq. 2, the 3D shape is expressed in a local coordinate system. It is possible to relate the 3D coordinates to the 2D image coordinate system. To this end, a weak perspective projection model can be used. In this example, perspective effects can be neglected since the depth variation of the face can be considered as small compared to its absolute depth. In one example, the mapping between the 3D face model and the image is given by a 2×4 matrix M encapsulating both the 3D face pose and the camera parameters. Thus, a 3D vertex $P_i = [X_i, Y_i, Z_i]^T \subset g$ will be projected onto the image point $p_i = [u_i, v_i]^T \subset I$ given by Eq. 4.

$$p_i = [u_i, v_i]^T = M[X_i, Y_i, Z_i, 1]^T \quad (4)$$

In one example, the deformable 3D model fitting estimates the 3D model configuration by minimizing the distances between the detected 2D projections of the face on the image ($d_j = [x_j, y_j]^T \subset I$, where j=1, . . . , q and q≤n) and their counterparts in the projected model. Table 7 shows a proposed method to achieve this purpose, which is referred to as deformable model back projection. In one example, it is possible to infer the configuration of a 3D deformable model from sparse data corresponding to one of its 2D projections. The more data detected on the image, the more shape and animation units will be able to vary in the model. In one example, the minimal condition to be ensured is that the points to be matched do not have to lie on the same plane. In one example, it is possible to define an error vector $e \in \mathbb{R}^q$ as shown in Eq. 5, where $p_j$ elements are obtained from Eq. 4 and $w_j$ elements refer to confidence values ($0 \le w_j \le 1$) for their corresponding $d_j$. This confidence can depend on the method used for the detection of points. In one example, it is possible to set higher weights (e.g., 1) to eye points, mouth points, nose top and base points, and the forehead center point, a second weight level (e.g., 0.8) to the eyebrow points and the rest of the contour points, and a third weight level (e.g., 0.2) to the left and right nostrils.

$$e_j = w_j \times \|d_j - p_j\|, \text{ where } j=1, \ldots, q \quad (5)$$

It is to be noted that the aspects and embodiments described herein may be conveniently implemented using one or more machines (e.g., one or more computing devices that are part of a system and/or method for detecting/matching a face in an image, or other systems and methods as disclosed herein) including hardware and special programming according to the teachings of the present specification, as will be apparent to those of ordinary skill in the computer art. Appropriate software coding can readily be prepared by skilled programmers based on the teachings of the present disclosure, as will be apparent to those of ordinary skill in the software art.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium is intended to be a hardware medium and does not include a signal. A machine-readable storage medium may be located in a variety of locations with respect to a machine/computing device configured to perform an embodiment of the current disclosure. Example locations for a machine-readable storage medium include, but are not limited to, internal to a machine/computing device, external to a machine/computing device, remote from a machine/computing device, associated with a network server connected to a machine/computing device (e.g., via the Internet, in the "Cloud"), removably connected to a machine/computing device, and any combinations thereof.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a computer workstation, a terminal computer, a server computer, a handheld device (e.g., tablet computer, a personal digital assistant "PDA", a mobile telephone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

Figure 16:
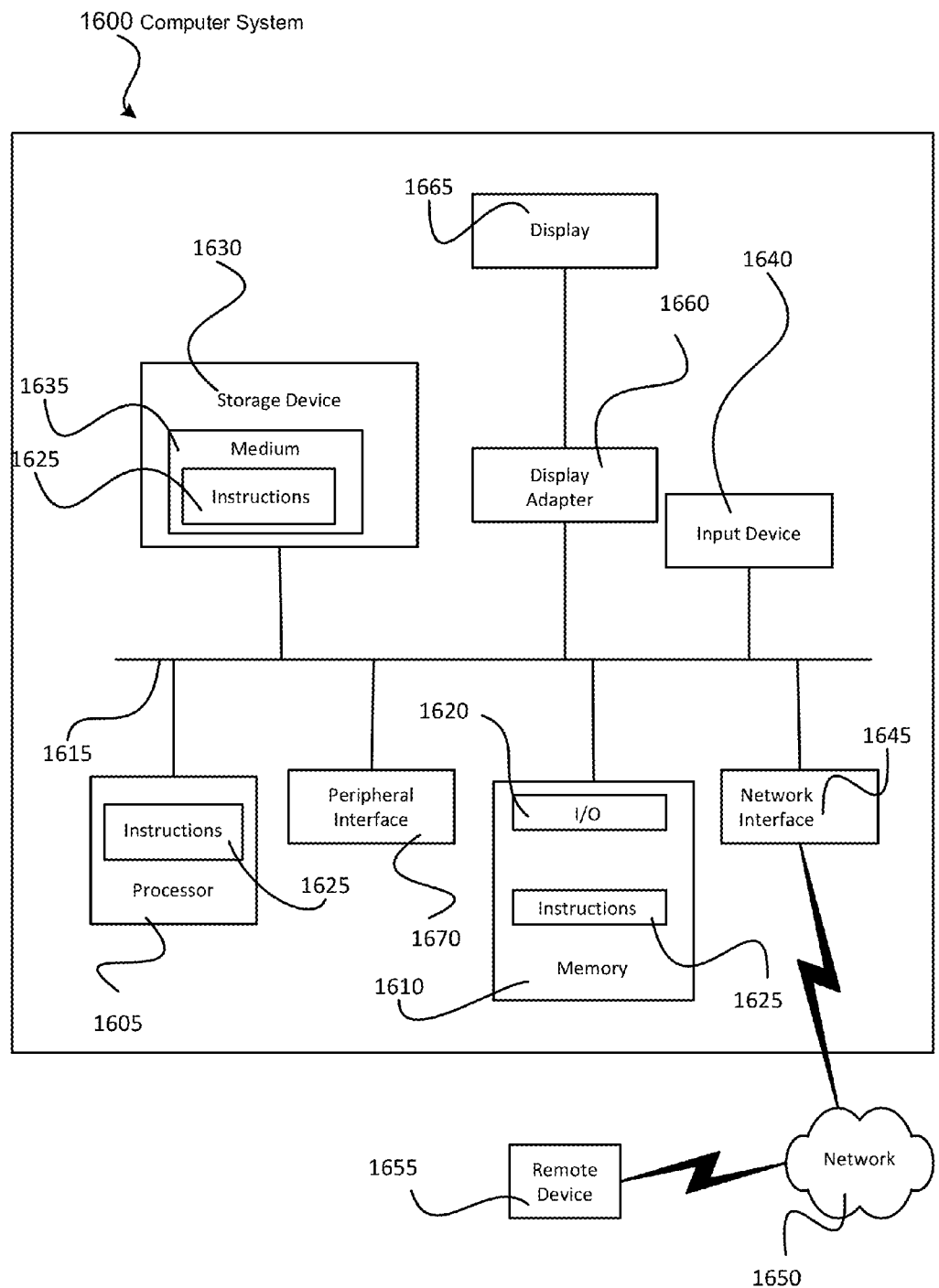
FIG. 16 is a block diagram of a computing system that can be used to implement any one or more of the methodologies disclosed herein and any one or more portions thereof.

FIG. 16 shows a diagrammatic representation of one embodiment of a computing device in the exemplary form of a computer system 1600 within which a set of instructions (e.g., machine-executable instructions) for causing the device to perform any one or more of the aspects and/or methodologies of the present disclosure may be executed. Such instructions may interact with the hardware of the specially programmed device to implement the concepts of the embodiments discussed above. It is also contemplated that multiple computing devices may be utilized to implement a specially configured set of instructions for causing the device to perform any one or more of the aspects and/or methodologies of the present disclosure. In some embodiments, when programmed according to one or more aspects of the present disclosure, computer system 1600 may comprise an independent face-matching system. Computer system 1600 includes a processor 1605 and a memory 1610 that communicate with each other, and with other components, via a bus 1615. Processor 1605 may include any number of processing cores. A processing resource may include any number of processors and/or processing cores to provide a processing ability to one or more of the aspects and/or methodologies described herein. Bus 1615 may include any of several types of bus structures including, but not limited to, a memory bus, a memory controller, a peripheral bus, a local bus, and any combinations thereof, using any of a variety of bus architectures.

Computer 1600 may include any number of memory elements, such as memory 1610 and/or storage device 1630 discussed below.

Memory 1610 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 1620 (BIOS), including basic routines that help to transfer information between elements within computer system 1600, such as during start-up, may be stored in memory 1610. Memory 1610 may also include (e.g., stored on one or more machine-readable media) instructions (e.g., software) 1625 embodying any one or more of the aspects and/or methodologies of the present disclosure. In another example, memory 1610 may further include any number of program modules including, but not limited to, an operating system, one or more application programs, other program modules, program data, and any combinations thereof.

Computer system 1600 may also include a storage device 1630. Examples of a storage device (e.g., storage device 1630) include, but are not limited to, a hard disk drive for reading from and/or writing to a hard disk, a magnetic disk drive for reading from and/or writing to a removable magnetic disk, an optical disk drive for reading from and/or writing to an optical media (e.g., a CD, a DVD, etc.), a solid-state memory device, and any combinations thereof. Storage device 1630 may be connected to bus 1615 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1630 may be removably interfaced with computer system 1600 (e.g., via an external port connector (not shown)). Particularly, storage device 1630 and an associated machine-readable medium 1635 may provide nonvolatile and/or volatile storage of machine-readable instructions, data structures, program modules, and/or other data for computer system 1600. In one example, software 1625 may reside, completely or partially, within machine-readable medium 1635. In another example, software 1625 may reside, completely or partially, within processor 1605.

Computer system 1600 may also include an input device 1640. In one example, a user of computer system 1600 may enter commands and/or other information into computer system 1600 via input device 1640. Examples of an input device 1640 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 1640 may be interfaced to bus 1615 via any of a variety of interfaces (not shown) including, but not limited to, a serial interface, a parallel interface, a game port, a USB interface, a FIREWIRE interface, a direct interface to bus 1615, and any combinations thereof.

A user may also input commands and/or other information to computer system 1600 via storage device 1630 (e.g., a removable disk drive, a flash drive, etc.) and/or a network interface device 1645. A network interface device, such as network interface device 1645 may be utilized for connecting computer system 1600 to one or more of a variety of networks, such as network 1650, and one or more remote devices 1655 connected thereto. Examples of a network interface device include, but are not limited to, a network interface card, a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a direct connection between two computing devices, a direct connection between components of a system and/or computing device, and any combinations thereof. A network, such as network 1650, may employ a wired and/or a wireless mode of communication. In general, any network topology may be used. Information (e.g., data, software 1625, etc.) may be communicated to and/or from computer system 1600 via network interface device 1645.

Computer system 1600 may further include a video display adapter 1660 for communicating a displayable image to a display device, such as display device 1665. Examples of a display device include, but are not limited to, a liquid crystal display (LCD), a cathode ray tube (CRT), a plasma display, and any combinations thereof. In addition to a display device, a network interface, and memory elements, a computer system 1600 may include one or more other peripheral output devices including, but not limited to, an audio speaker, a printer, and any combinations thereof. Such peripheral output devices may be connected to bus 1615 via a peripheral interface 1670. Examples of a peripheral interface include, but are not limited to, a serial port, a USB connection, a FIREWIRE connection, a parallel connection, and any combinations thereof. Query results as described herein may be presented via any of the output capable elements of computer 1600 including, but not limited to, video display adapter 1660 and/or one or more other peripheral output devices.

It is noted that the methods for detecting/matching an image of a face above and the related methodologies and embodiments focus on a face as the object for recognition in an image. It is contemplated that other objects in an image may also benefit from the methods and systems described herein. Where appropriate, it is contemplated that where an image and/or template of a face are utilized, an image and/or template of another object may additionally or alternatively be utilized.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A computerized method for detecting a known face within an image, the method being executed by a face-matching system and comprising:
    obtaining a first image of the known face;
    generating a facial template based on a facial region corresponding to the known face in the first image, said facial template including a plurality of facial image files;
    generating component templates for a plurality of subregions, each subregion associated with a facial feature within the facial region, said component templates each including a plurality of component image files;
    comparing one or more of said facial image files to a second image to identify a facial region in the second image matching a facial image file of the facial template with a confidence value exceeding a predetermined facial region confidence threshold;
    comparing one or more component image files for one or more of said component templates to the second image to identify a component region within the facial region of the second image matching a component image file of one or more of said component templates with a confidence value exceeding a predetermined component region confidence threshold; and
    detecting the face in the second image as the face in the first image when said matching facial region and component regions are identified,
    wherein said obtaining a first image comprises:
        providing a user with an interface for controlling an imaging device, the interface having a plurality of graphic outlines superimposed upon a display of an image of the known face;
        prompting the user to substantially align the face and facial features with the plurality of graphic outlines corresponding to the facial region and subregions;
        prompting the user to acquire the first image through the imaging device using the interface; and
        acquiring the first image using the imaging device, the first image being correlated to the facial region and subregions.

2. A computer-implemented method according to claim 1, wherein said obtaining a first image further comprises receiving an adjustment from the user via the interface, the adjustment aligning one or more of the plurality of graphic outlines with a desired one of the plurality of subregions of the face on the acquired image.

3. A computer-implemented method according to claim 1, wherein at least two of the plurality of facial image files have different scale resolutions.

4. A computer-implemented method according to claim 1, wherein at least two of the plurality of component image files for one or more of said component templates have different scale resolutions.

5. A computer-implemented method according to claim 1, further comprising obtaining at least one of the first image and second image using an imaging device.

6. A computer-implemented method according to claim 5, wherein the imaging device is a video camera.

7. A computer-implemented method according to claim 1, further comprising storing the facial template and each of the component templates and accessing the stored templates for said comparing.

8. A machine readable hardware storage medium containing machine-executable instructions for implementing a method for detecting a known face within an image, the machine-executable instructions comprising:
    a first set of instructions for obtaining a first image of the known face;
    a second set of machine-executable instructions for generating a facial template based on a facial region corresponding to the known face in the first image, said facial template including a plurality of facial image files;
    a third set of instructions for generating component templates for a plurality of subregions, each subregion associated with a facial feature within the facial region, said component templates each including a plurality of component image files;
    a fourth set of instructions for comparing one or more of said facial image files to a second image to identify a facial region in the second image matching a facial image file of the facial template with a confidence value exceeding a predetermined facial region confidence threshold;

a fifth set of instructions for comparing one or more component image files for one or more of said component templates to the second image to identify a component region within the facial region of the second image matching a component image file of one or more of said component templates with a confidence value exceeding a predetermined component region confidence threshold; and a sixth set of instructions for detecting the face in the second image as the face in the first image when said matching facial region and component regions are identified, wherein said first set of instructions for obtaining a first image comprises:
   a set of machine-executable instructions for providing a user with an interface for controlling an imaging device, the interface having a plurality of graphic outlines superimposed upon a display of an image of the known face;
   a set of machine-executable instructions for prompting the user to substantially align the face and facial features with the plurality of graphic outlines corresponding to the facial region and subregions;
   a set of machine-executable instructions for prompting the user to acquire the first image through the imaging device using the interface; and
   a set of machine-executable instructions for acquiring the first image using the imaging device, the first image being correlated to the facial region and subregions.

9. A machine readable hardware storage medium according to claim 8, wherein said first set of instructions for obtaining a first image further comprises a set of machine-executable instructions for receiving an adjustment from the user via the interface, the adjustment aligning one or more of the plurality of graphic outlines with a desired one of the plurality of subregions of the face on the acquired image.

10. A machine readable hardware storage medium according to claim 8, wherein at least two of the plurality of facial image files have different scale resolutions.

11. A machine readable hardware storage medium according to claim 8, wherein at least two of the plurality of component image files for one or more of said component templates have different scale resolutions.

12. A machine readable hardware storage medium according to claim 8, wherein the first image has a first scale resolution and said second set of machine-executable instructions for generating a facial template comprises:
   a set of machine-executable instructions for generating a first image file representing the facial region at the first scale resolution; and
   a set of machine-executable instructions for generating at least a second image file representing the facial region at a second scale resolution.

13. A machine readable hardware storage medium according to claim 12, wherein said second set of machine-executable instructions for generating a facial template further comprises:
   a set of machine-executable instructions for determining a minimum scale resolution for the facial template;
   a set of machine-executable instructions for determining a maximum scale resolution for the facial template; and
   a set of machine-executable instructions for generating a plurality of image files, each of the plurality of image files representing the facial region at a scale resolution increment in a range from the minimum scale resolution to the maximum scale resolution, said plurality of image files comprising the facial template.

14. A machine readable hardware storage medium according to claim 12, wherein said third set of machine-executable instructions for generating component templates for a plurality of subregions comprises:
   a set of machine-executable instructions for generating a first image file representing a corresponding subregion at the first scale resolution; and
   a set of machine-executable instructions for generating at least a second image file representing the corresponding subregion at a second scale resolution.

15. A machine readable hardware storage medium according to claim 14, wherein said third set of machine-executable instructions for generating component templates for a plurality of subregions further comprises:
   a set of machine-executable instructions for determining a minimum scale resolution for the component template;
   a set of machine-executable instructions for determining a maximum scale resolution for the component template; and
   a set of machine-executable instructions for generating a plurality of component image files, each of the plurality of component image files representing a corresponding subregion at a scale resolution increment in a range from the minimum scale resolution to the maximum scale resolution, each said component template comprising the plurality of corresponding component image files.

16. A machine readable hardware storage medium according to claim 8, the machine-executable instructions further comprising a seventh set of instructions for obtaining at least one of the first image and second image using an imaging device.

17. A machine readable hardware storage medium according to claim 16, wherein the imaging device is a video camera.

18. A machine readable hardware storage medium according to claim 8, the machine-executable instructions further comprising a seventh set of instructions for storing the facial template and each of the component templates and accessing the stored templates for said comparing.

19. A mobile device comprising:
   an imaging device for capturing an image of a known face of a person;
   a storage device in operative communication with said imaging device, said storage device containing:
      a first set of machine-executable instructions for obtaining a first image of the known face;
      a second set of machine-executable instructions for generating a facial template based on a facial region corresponding to the known face in the first image, said facial template including a plurality of facial image files;
      a third set of machine-executable instructions for generating component templates for a plurality of subregions, each subregion associated with a facial feature within the facial region, said component templates each including a plurality of component image files;
      a fourth set of machine-executable instructions for comparing one or more of said facial image files to a second image to identify a facial region in the second image matching a facial image file of the facial template with a confidence value exceeding a predetermined facial region confidence threshold;
      a fifth set of machine-executable instructions for comparing one or more component image files for one or more of said component templates to the second image to identify a component region within the facial region of the second image matching a component image file of one or more of said component templates with a confidence value exceeding a predetermined component region confidence threshold;

a sixth set of machine-executable instructions for detecting the face in the second image as the face in the first image when said matching facial region and component regions are identified;

a seventh set of machine-executable instructions for detecting a plurality of two-dimensional facial points within the matching facial region;

an eighth set of machine-executable instructions for initializing a three-dimensional model as a function of the facial points;

a ninth set of machine-executable instructions for obtaining a third image of the known face;

a tenth set of machine-executable instructions for determining a correlation between the three-dimensional model and the third image;

an eleventh set of machine-executable instructions for automatedly adjusting the three-dimensional model as a function of the correlation; and a twelfth set of machine-executable instructions for mapping a three-dimensional graphical mask to the known face in the third image as a function of the three-dimensional model and the third image; and a processor in operative communication with said imaging device and said storage device for executing one or more of said machine-executable instructions.

20. A mobile device according to claim 19, wherein the mobile device is a mobile phone.

21. A mobile device according to claim 19, wherein at least two of the plurality of facial image files have different scale resolutions.

22. A mobile device according to claim 19, wherein at least two of the plurality of component image files for one or more of said component templates have different scale resolutions.

23. A mobile device according to claim 19, wherein the first image has a first scale resolution and said second set of machine-executable instructions for generating a facial template comprises:

a set of machine-executable instructions for generating a first image file representing the facial region at the first scale resolution; and a set of machine-executable instructions for generating at least a second image file representing the facial region at a second scale resolution.

24. A mobile device according to claim 23, wherein said third set of machine-executable instructions for generating component templates for a plurality of subregions comprises:

a set of machine-executable instructions for generating a first image file representing a corresponding subregion at the first scale resolution; and a set of machine-executable instructions for generating at least a second image file representing the corresponding subregion at a second scale resolution.

25. A mobile device according to claim 19, further comprising a seventh set of instructions for obtaining at least one of the first image and second image using the imaging device.

26. A computerized method for detecting a known face within an image, the method being executed by a face-matching system and comprising:

obtaining a first image of the known face;

generating a facial template based on a facial region corresponding to the known face in the first image, said facial template including a plurality of facial image files;

generating component templates for a plurality of subregions, each subregion associated with a facial feature within the facial region, said component templates each including a plurality of component image files;

comparing one or more of said facial image files to a second image to identify a facial region in the second image matching a facial image file of the facial template with a confidence value exceeding a predetermined facial region confidence threshold;

comparing one or more component image files for one or more of said component templates to the second image to identify a component region within the facial region of the second image matching a component image file of one or more of said component templates with a confidence value exceeding a predetermined component region confidence threshold; and detecting the face in the second image as the face in the first image when said matching facial region and component regions are identified, wherein the first image has a first scale resolution and said generating a facial template comprises:

generating a first image file representing the facial region at the first scale resolution; and generating at least a second image file representing the facial region at a second scale resolution, and wherein said generating a facial template further comprises:

determining a minimum scale resolution for the facial template;

determining a maximum scale resolution for the facial template; and generating a plurality of image files, each of the plurality of image files representing the facial region at a scale resolution increment in a range from the minimum scale resolution to the maximum scale resolution, said plurality of image files comprising the facial template.

27. A computerized method for detecting a known face within an image, the method being executed by a face-matching system and comprising:

obtaining a first image of the known face;

generating a facial template based on a facial region corresponding to the known face in the first image, said facial template including a plurality of facial image files;

generating component templates for a plurality of subregions, each subregion associated with a facial feature within the facial region, said component templates each including a plurality of component image files;

comparing one or more of said facial image files to a second image to identify a facial region in the second image matching a facial image file of the facial template with a confidence value exceeding a predetermined facial region confidence threshold;

comparing one or more component image files for one or more of said component templates to the second image to identify a component region within the facial region of the second image matching a component image file of one or more of said component templates with a confidence value exceeding a predetermined component region confidence threshold; and detecting the face in the second image as the face in the first image when said matching facial region and component regions are identified, wherein at least one of identifying a facial region and identifying a component region utilizes an equation having the normalized correlation coefficient:

$$R(x, y) = \frac{\sum_{x', y'} (T'(x', y') \cdot I'(x + x', y + y'))}{\sqrt{\sum_{x', y'} T'(x', y')^2 \cdot \sum_{x', y'} I'(x + x', y + y')^2}},$$

wherein T is an image of the facial template or one of the component templates of size (w·h), I is the second image of size (W·H), and for each location of T over I, a match metric is stored in a result image R of size (W−w+1)· (H−h+1), and wherein x'=1, . . . , w,y'=1, . . . , h, T'(x', y')=T'(x',y')−1/(w·h)·Σ$_{x'',y''}$T(x'',y'') and I' (x+x',y+y)=I (x+x', y+y')−1/(w·h)·Σ$_{x'',y''}$I(x+x'',y+y'').

28. A computerized method for detecting a known face within an image, the method being executed by a face-matching system and comprising:
  obtaining a first image of the known face;
  generating a facial template based on a facial region corresponding to the known face in the first image, said facial template including a plurality of facial image files;
  generating component templates for a plurality of subregions, each subregion associated with a facial feature within the facial region, said component templates each including a plurality of component image files;
  comparing one or more of said facial image files to a second image to identify a facial region in the second image matching a facial image file of the facial template with a confidence value exceeding a predetermined facial region confidence threshold;
  comparing one or more component image files for one or more of said component templates to the second image to identify a component region within the facial region of the second image matching a component image file of one or more of said component templates with a confidence value exceeding a predetermined component region confidence threshold;
  detecting the face in the second image as the face in the first image when said matching facial region and component regions are identified;
  detecting a plurality of two-dimensional facial points within the matching facial region;
  initializing a three-dimensional model as a function of the facial points;
  obtaining a third image of the known face;
  determining a correlation between the three-dimensional model and the third image; and
  automatedly adjusting the three-dimensional model as a function of the correlation.

29. A computer-implemented method according to claim 28, the method further comprising:
  mapping a three-dimensional graphical mask to the known face in the third image as a function of the three-dimensional model and the third image.

30. A machine readable hardware storage medium containing machine-executable instructions for implementing a method for detecting a known face within an image, the machine-executable instructions comprising:
  a first set of instructions for obtaining a first image of the known face;
  a second set of machine-executable instructions for generating a facial template based on a facial region corresponding to the known face in the first image, said facial template including a plurality of facial image files;
  a third set of instructions for generating component templates for a plurality of subregions, each subregion associated with a facial feature within the facial region, said component templates each including a plurality of component image files;
  a fourth set of instructions for comparing one or more of said facial image files to a second image to identify a facial region in the second image matching a facial image file of the facial template with a confidence value exceeding a predetermined facial region confidence threshold;
  a fifth set of instructions for comparing one or more component image files for one or more of said component templates to the second image to identify a component region within the facial region of the second image matching a component image file of one or more of said component templates with a confidence value exceeding a predetermined component region confidence threshold; and
  a sixth set of instructions for detecting the face in the second image as the face in the first image when said matching facial region and component regions are identified,
  wherein at least one of said fourth set of instructions and said fifth set of instructions contains a set of machine-executable instructions utilizing an equation having the normalized correlation coefficient:

$$R(x, y) = \frac{\sum_{x', y'} (T'(x', y') \cdot I'(x + x', y + y'))}{\sqrt{\sum_{x', y'} T'(x', y')^2 \cdot \sum_{x', y'} I'(x + x', y + y')^2}},$$

wherein T is an image of the facial template or one of the component templates of size (w·h), I is the second image of size (W·H), and for each location of T over I, a match metric is stored in a result image R of size (W−w+1)· (H−h+1), and wherein x'=1, . . . , w,y'=1, . . . , h, T'(x', y')=T'(x',y')−1/(w·h)·Σ$_{x'',y''}$T (x'',y'') and I' (x+x',y+y')=I (x+x', y+y')−1/(w·h)·Σ$_{x'',y''}$I (x+x'',y+y'').

31. A machine readable hardware storage medium containing machine-executable instructions for implementing a method for detecting a known face within an image, the machine-executable instructions comprising:
  a first set of instructions for obtaining a first image of the known face;
  a second set of machine-executable instructions for generating a facial template based on a facial region corresponding to the known face in the first image, said facial template including a plurality of facial image files;
  a third set of instructions for generating component templates for a plurality of subregions, each subregion associated with a facial feature within the facial region, said component templates each including a plurality of component image files;
  a fourth set of instructions for comparing one or more of said facial image files to a second image to identify a facial region in the second image matching a facial image file of the facial template with a confidence value exceeding a predetermined facial region confidence threshold;
  a fifth set of instructions for comparing one or more component image files for one or more of said component templates to the second image to identify a component region within the facial region of the second image matching a component image file of one or more of said component templates with a confidence value exceeding a predetermined component region confidence threshold;

a sixth set of instructions for detecting the face in the second image as the face in the first image when said matching facial region and component regions are identified;

a seventh set of instructions for detecting a plurality of two-dimensional facial points within the matching facial region;

an eighth set of instructions for initializing a three-dimensional model as a function of the facial points;

a ninth set of instructions for obtaining a third image of the known face;

a tenth set of instructions for determining a correlation between the three-dimensional model and the third image; and an eleventh set of instructions for automatedly adjusting the three-dimensional model as a function of the correlation.

32. A machine readable hardware storage medium according to claim 31, the machine-executable instructions further comprising:

a twelfth set of instructions for mapping a three-dimensional graphical mask to the known face in the third image as a function of the three-dimensional model and the third image.

33. A computerized method for detecting a known face within an image, the method being executed by a face-matching system and comprising:

obtaining a first image of the known face;

generating a facial template based on a facial region corresponding to the known face in the first image, said facial template including a plurality of facial image files;

generating component templates for a plurality of subregions, each subregion associated with a facial feature within the facial region, said component templates each including a plurality of component image files;

comparing one or more of said facial image files to a second image to identify a facial region in the second image matching a facial image file of the facial template with a confidence value exceeding a predetermined facial region confidence threshold;

comparing one or more component image files for one or more of said component templates to the second image to identify a component region within the facial region of the second image matching a component image file of one or more of said component templates with a confidence value exceeding a predetermined component region confidence threshold; and detecting the face in the second image as the face in the first image when said matching facial region and component regions are identified, wherein the first image has a first scale resolution and said generating a facial template comprises:

generating a first image file representing the facial region at the first scale resolution; and generating at least a second image file representing the facial region at a second scale resolution, and wherein said generating component templates for a plurality of subregions further comprises:

generating a first image file representing a corresponding subregion at the first scale resolution; and generating at least a second image file representing the corresponding subregion at a second scale resolution;

determining a minimum scale resolution for the component template;

determining a maximum scale resolution for the component template; and generating a plurality of component image files, each of the plurality of component image files representing a corresponding subregion at a scale resolution increment in a range from the minimum scale resolution to the maximum scale resolution, each said component template comprising the plurality of corresponding component image files.

\* \* \* \* \*